US011783259B2

(12) United States Patent
Servidone et al.

(10) Patent No.: US 11,783,259 B2
(45) Date of Patent: *Oct. 10, 2023

(54) INTERACTIVE GRAPHICAL USER INTERFACE FOR INSURANCE CLAIM HANDLERS INCLUDING IDENTIFYING INSURANCE CLAIM RISKS AND HEALTH SCORES VIA A BODY DIAGRAM DASHBOARD

(71) Applicant: Hartford Fire Insurance Company, Hartford, CT (US)

(72) Inventors: Courtney E. Servidone, Baldwinsville, NY (US); Oksana Kamyshin, Spring, TX (US); Keren Shemesh, West Hartford, CT (US); Kari Anne Palmer, Avon, CT (US); Andrew C Cushman, N Syracuse, NY (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,391

(22) Filed: Jan. 14, 2022

(65) Prior Publication Data
US 2022/0138647 A1 May 5, 2022

Related U.S. Application Data

(63) Continuation of application No. 16/231,716, filed on Dec. 24, 2018, now Pat. No. 11,257,018.

(51) Int. Cl.
*G06Q 10/0635* (2023.01)
*G06Q 10/10* (2023.01)
(Continued)

(52) U.S. Cl.
CPC ....... *G06Q 10/0635* (2013.01); *G06F 16/904* (2019.01); *G06N 20/00* (2019.01); *G06Q 10/10* (2013.01)

(58) Field of Classification Search
CPC .... G06Q 40/08; G06Q 10/0635; G06Q 10/10; G06F 16/904; G06N 20/00
See application file for complete search history.

(56) References Cited

U.S. PATENT DOCUMENTS 4,837,693 A * 6/1989 Schotz .................. G06Q 40/08
705/4
4,916,611 A * 4/1990 Doyle, Jr. ............. G16H 10/60
705/2

(Continued)

*Primary Examiner* — Scott L Jarrett
(74) *Attorney, Agent, or Firm* — Buckley, Maschoff & Talwalkar LLC

(57) ABSTRACT

A system to provide an automated risk relationship resource allocation tool via back-end application computer server of an enterprise. A resource allocation data store may contain electronic records representing requested resource allocations between the enterprise and a plurality of entities. The server may receive an indication of a selected requested resource allocation and retrieve, from the resource allocation data store, the electronic record associated with the selected requested resource allocation. The server may execute a machine learning algorithm to generate an overall score for the selected requested resource allocation and generate a request health index via an analytic model for the entity associated with the selected requested resource allocation. The system may then support a graphical interactive user interface display via a distributed communication network, the interactive user interface display providing resource allocation data including the overall score and the request health index.

24 Claims, 11 Drawing Sheets

(51) Int. Cl.
*G06F 16/904* (2019.01)
*G06N 20/00* (2019.01)

(56) References Cited

U.S. PATENT DOCUMENTS

| | | | | |
|---|---|---|---|---|
| 5,253,164 A * | 10/1993 | Holloway | G06Q 40/02 | 705/2 |
| 5,544,044 A * | 8/1996 | Leatherman | G16H 20/10 | 705/2 |
| 5,613,072 A * | 3/1997 | Hammond | G06Q 40/08 | 705/35 |
| 5,809,478 A * | 9/1998 | Greco | G06Q 40/08 | 709/200 |
| 5,835,897 A * | 11/1998 | Dang | G06Q 40/02 | 705/2 |
| 5,924,073 A * | 7/1999 | Tyuluman | G16H 10/60 | 600/300 |
| 6,223,164 B1 * | 4/2001 | Seare | G16H 40/20 | 705/2 |
| 6,253,186 B1 * | 6/2001 | Pendleton, Jr. | G06Q 40/08 | 705/7.29 |
| 6,324,516 B1 * | 11/2001 | Shults | G06Q 10/10 | 705/2 |
| 6,330,546 B1 * | 12/2001 | Gopinathan | G06Q 40/00 | 705/38 |
| 6,826,536 B1 * | 11/2004 | Forman | G06Q 10/10 | 705/3 |
| 6,845,102 B1 * | 1/2005 | Bendelac | H04L 69/04 | 370/465 |
| 6,901,437 B1 * | 5/2005 | Li | H04L 67/04 | 709/219 |
| 7,395,217 B1 * | 7/2008 | Stevens | G06Q 40/08 | 705/2 |
| 7,398,218 B1 * | 7/2008 | Bernaski | G06Q 40/08 | 705/3 |
| 7,406,453 B2 * | 7/2008 | Mundie | G16H 50/20 | 706/20 |
| 7,716,147 B2 * | 5/2010 | Kelly | G16Z 99/00 | 706/18 |
| 7,783,505 B2 * | 8/2010 | Roschelle | G06Q 10/10 | 705/35 |
| 7,813,944 B1 * | 10/2010 | Luk | G06Q 10/10 | 705/2 |
| 7,827,045 B2 * | 11/2010 | Madill, Jr. | G06Q 40/08 | 705/4 |
| 7,860,812 B2 * | 12/2010 | Hartley | G06Q 20/102 | 706/12 |
| 7,873,528 B2 * | 1/2011 | Bregante | G06Q 20/4016 | 705/2 |
| 8,050,945 B2 * | 11/2011 | Patterson | G16H 10/60 | 600/300 |
| 8,069,080 B2 * | 11/2011 | Rastogi | G06Q 30/018 | 705/7.41 |
| 8,086,474 B1 * | 12/2011 | Lasalle | G06Q 40/00 | 705/35 |
| 8,108,225 B2 * | 1/2012 | Logue | H04M 15/73 | 705/2 |
| 8,290,796 B1 * | 10/2012 | Kruckeberg | G06Q 30/00 | 705/4 |
| 8,321,243 B1 * | 11/2012 | Harris, Sr. | G16H 20/10 | 705/3 |
| 8,340,981 B1 * | 12/2012 | Cave | G06Q 10/10 | 705/2 |
| 8,554,584 B2 * | 10/2013 | Hargroder | G06Q 10/10 | 705/4 |
| 8,600,769 B2 * | 12/2013 | Drucker | G06Q 10/10 | 705/2 |
| 8,630,878 B1 * | 1/2014 | Kravets | G06Q 40/08 | 705/4 |
| 8,639,522 B2 * | 1/2014 | Pathria | G06Q 40/02 | 705/2 |
| 8,856,923 B1 * | 10/2014 | Koi | G06Q 20/4016 | 709/227 |
| 9,836,794 B2 * | 12/2017 | Hopkins | G06Q 40/08 | |
| 9,940,675 B2 * | 4/2018 | Kinney | G06Q 40/08 | |
| 10,083,452 B1 * | 9/2018 | Cox | G06Q 30/0185 | |
| 10,169,408 B1 * | 1/2019 | Murikipudi | G06Q 30/04 | |
| 10,187,762 B2 * | 1/2019 | Khaleghi | G10L 25/63 | |
| 10,372,879 B2 * | 8/2019 | Subramanian | G16H 15/00 | |
| 10,373,140 B1 * | 8/2019 | Chang | G06F 16/24575 | |
| 10,484,845 B2 * | 11/2019 | Khaleghi | G06F 3/0487 | |
| 10,628,509 B2 * | 4/2020 | Skellenger | G06Q 10/06 | |
| 11,228,875 B2 * | 1/2022 | Khaleghi | G10L 15/26 | |
| 11,250,364 B2 * | 2/2022 | Beznos | G06V 10/764 | |
| 11,257,018 B2 * | 2/2022 | Servidone | G06Q 10/0635 | |
| 2001/0044735 A1 * | 11/2001 | Colburn | G06Q 40/08 | 705/4 |
| 2002/0128883 A1 * | 9/2002 | Harris | G06Q 40/08 | 705/4 |
| 2003/0037014 A1 * | 2/2003 | Shimizu | G06Q 10/06 | 705/400 |
| 2003/0158751 A1 * | 8/2003 | Suresh | G06Q 40/02 | 702/179 |
| 2005/0060205 A1 * | 3/2005 | Woods | G06F 9/453 | 705/4 |
| 2005/0131738 A1 * | 6/2005 | Morris | G16H 40/63 | 705/2 |
| 2006/0229890 A1 * | 10/2006 | Sattler | G06Q 10/063 | 705/320 |
| 2008/0046297 A1 * | 2/2008 | Shafer | G06Q 10/10 | 705/4 |
| 2008/0154672 A1 * | 6/2008 | Skedsvold | G06Q 10/063114 | 705/7.26 |
| 2008/0288424 A1 * | 11/2008 | Iyengar | G06Q 10/00 | 706/12 |
| 2010/0088125 A1 * | 4/2010 | Vaughan | G06Q 40/08 | 709/217 |
| 2010/0145734 A1 * | 6/2010 | Becerra | G06Q 40/08 | 705/4 |
| 2010/0223572 A1 * | 9/2010 | Upadhyaya | G06Q 10/10 | 715/764 |
| 2011/0015948 A1 * | 1/2011 | Adams | G06Q 10/087 | 704/2 |
| 2011/0077977 A1 * | 3/2011 | Collins | G06Q 40/08 | 707/755 |
| 2011/0295623 A1 * | 12/2011 | Behringer | G06Q 40/08 | 704/235 |
| 2012/0010908 A1 * | 1/2012 | Doelling | G06Q 40/08 | 705/4 |
| 2012/0022897 A1 * | 1/2012 | Shafer | G06Q 40/08 | 705/4 |
| 2012/0096384 A1 * | 4/2012 | Albert | G06Q 40/06 | 707/E17.082 |
| 2012/0102026 A1 * | 4/2012 | Fortune | G06Q 10/10 | 707/E17.014 |
| 2012/0116804 A1 * | 5/2012 | Mesika | G16H 50/70 | 705/3 |
| 2012/0284052 A1 * | 11/2012 | Saukas | G06Q 10/00 | 705/3 |
| 2012/0303381 A1 * | 11/2012 | Bessette | A61B 5/743 | 705/2 |
| 2012/0310676 A1 * | 12/2012 | Britton | G06Q 40/08 | 705/4 |
| 2013/0325493 A1 * | 12/2013 | Wong | G16Z 99/00 | 705/2 |
| 2013/0346097 A1 * | 12/2013 | Adams | G06Q 10/1057 | 705/2 |
| 2014/0081652 A1 * | 3/2014 | Klindworth | G06Q 10/0635 | 705/2 |
| 2014/0278566 A1 * | 9/2014 | McLaughlin | G06Q 40/08 | 705/4 |
| 2014/0350972 A1 * | 11/2014 | Haywood | G06Q 40/02 | 705/4 |
| 2015/0081342 A1 * | 3/2015 | Dawson | G06Q 40/08 | 705/4 |
| 2015/0106129 A1 * | 4/2015 | Kinney | G06Q 40/08 | 705/4 |
| 2015/0205825 A1 * | 7/2015 | Sengupta | G06F 16/2365 | 707/758 |

(56) References Cited

U.S. PATENT DOCUMENTS

| | | | |
|---|---|---|---|
| 2015/0242956 A1* | 8/2015 | Schultz | G06Q 40/08 705/4 |
| 2015/0287143 A1* | 10/2015 | Gabriel | G06Q 40/08 705/4 |
| 2016/0055589 A1* | 2/2016 | Billings | G06Q 40/08 705/4 |
| 2016/0063197 A1* | 3/2016 | Kumetz | G06Q 10/1057 705/3 |
| 2016/0110818 A1* | 4/2016 | Shemesh | G06Q 40/08 705/4 |
| 2016/0125544 A1* | 5/2016 | Edwards | G06Q 10/1057 705/4 |
| 2016/0125546 A1* | 5/2016 | Bostic | G06Q 40/08 705/4 |
| 2017/0090723 A1* | 3/2017 | Baumecker | G06Q 10/063 |
| 2017/0323390 A1* | 11/2017 | Keating | G06Q 10/00 |
| 2018/0239870 A1* | 8/2018 | Goldman | G16H 40/20 |
| 2019/0244302 A1* | 8/2019 | Levy | G16H 10/60 |
| 2020/0074558 A1* | 3/2020 | Albert | G06Q 10/10 |
| 2020/0202267 A1* | 6/2020 | Servidone | G06F 16/904 |
| 2020/0279334 A1* | 9/2020 | Billings | G06Q 40/08 |
| 2020/0364797 A1* | 11/2020 | Halpern-Manners | G06Q 50/182 |
| 2021/0117923 A1* | 4/2021 | Gray | G06Q 10/06375 |
| 2021/0327586 A1* | 10/2021 | Tomchik | G16H 70/60 |
| 2022/0005122 A1* | 1/2022 | Yoo | G06Q 10/10 |
| 2022/0138647 A1* | 5/2022 | Servidone | G06Q 10/0635 705/7.28 |

* cited by examiner

INTERACTIVE GRAPHICAL USER INTERFACE FOR INSURANCE CLAIM HANDLERS INCLUDING IDENTIFYING INSURANCE CLAIM RISKS AND HEALTH SCORES VIA A BODY DIAGRAM DASHBOARD

CROSS-REFERENCE TO RELATED APPLICATIONS

The present application is a continuation of U.S. patent application Ser. No. 16/231,716 entitled "INTERACTIVE USER INTERFACE FOR INSURANCE CLAIM HANDLERS INCLUDING IDENTIFYING INSURANCE CLAIM RISKS AND HEALTH SCORES" and filed Dec. 24, 2018. The entire content of that application is incorporated herein by reference.

BACKGROUND

It may be advantageous to analyze the risks and resource allocations associated with multiple systems and/or entities. For example, it might be advantageous to understand particular amounts of risk and allocations and the impact that such risks and allocations may have had on past (and, potentially, future) performance. Moreover, an enterprise might want to facilitate understanding and reaction to requests for allocations of resources—and a manual review of such requests may be an important part of this process. The breadth and depth of information associated with resource requests, often over an extended period of time, can overwhelm such a review process. That is, manually examining and understanding these types of risks and allocations associated with risk relationships can be a complicated, time consuming, and error-prone task, especially when there are a substantial number of inter-related systems, entities, characteristics impacting resource allocations, and/or other factors involved in the analysis.

It would be desirable to provide systems and methods to provide an automated risk relationship resource allocation tool in a way that provides faster, more accurate results as compared to traditional approaches.

SUMMARY OF THE INVENTION

According to some embodiments, systems, methods, apparatus, computer program code and means are provided to provide an automated risk relationship resource allocation tool in a way that provides faster, more accurate results as compared to traditional approaches and that allow for flexibility and effectiveness when responding to those results. In some embodiments, a system may provide an automated risk relationship resource allocation tool via back-end application computer server of an enterprise. The system may include a resource allocation data store that contains electronic records representing requested resource allocations between the enterprise and a plurality of entities. The server may receive an indication of a selected requested resource allocation and retrieve, from the resource allocation data store, the electronic record associated with the selected requested resource allocation. The server may execute a machine learning algorithm to generate an overall score for the selected requested resource allocation and generate a request health index via an analytic model for the entity associated with the selected requested resource allocation. The system may then support a graphical interactive user interface display via a distributed communication network, the interactive user interface display providing resource allocation data including the overall score and the request health index.

Some embodiments comprise: means for receiving, by a computer processor of a back-end application computer server from a resource allocation data store, an indication of a selected requested resource allocation between an enterprise and an entity, wherein the resource allocation data store contains electronic records that represent a plurality of requested resource allocations between the enterprise and a plurality of entities, and further wherein each electronic record includes an electronic record identifier and a set of resource allocation values associated with risk attributes; means for retrieving, from the resource allocation data store, the electronic record associated with the selected requested resource allocation, including the set of resource allocation values associated with risk attributes; means for executing a machine learning algorithm to generate an overall score for the selected requested resource allocation; and means for generating a request health index via an analytic model for the entity associated with the selected requested resource allocation, wherein the back-end application computer server supports a graphical interactive user interface display via a distributed communication network, the interactive user interface display providing resource allocation data including the overall score and the request health index.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to provide an automated risk relationship resource allocation tool in a way that provides faster, more accurate results as compared to traditional approaches. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of electronic risk analysis and/or resource allocation by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via back-end-end application server to accurately improve the analysis of risk, the allocation of resources, and the exchange of information, thus improving the overall efficiency of the system associated with message storage requirements and/or bandwidth considerations (e.g., by reducing the number of messages that need to be transmitted via a network). Moreover, embodiments associated with collecting accurate information might further improve risk values, predictions of risk values, allocations of resources, electronic record routing, etc.

Figure 1:
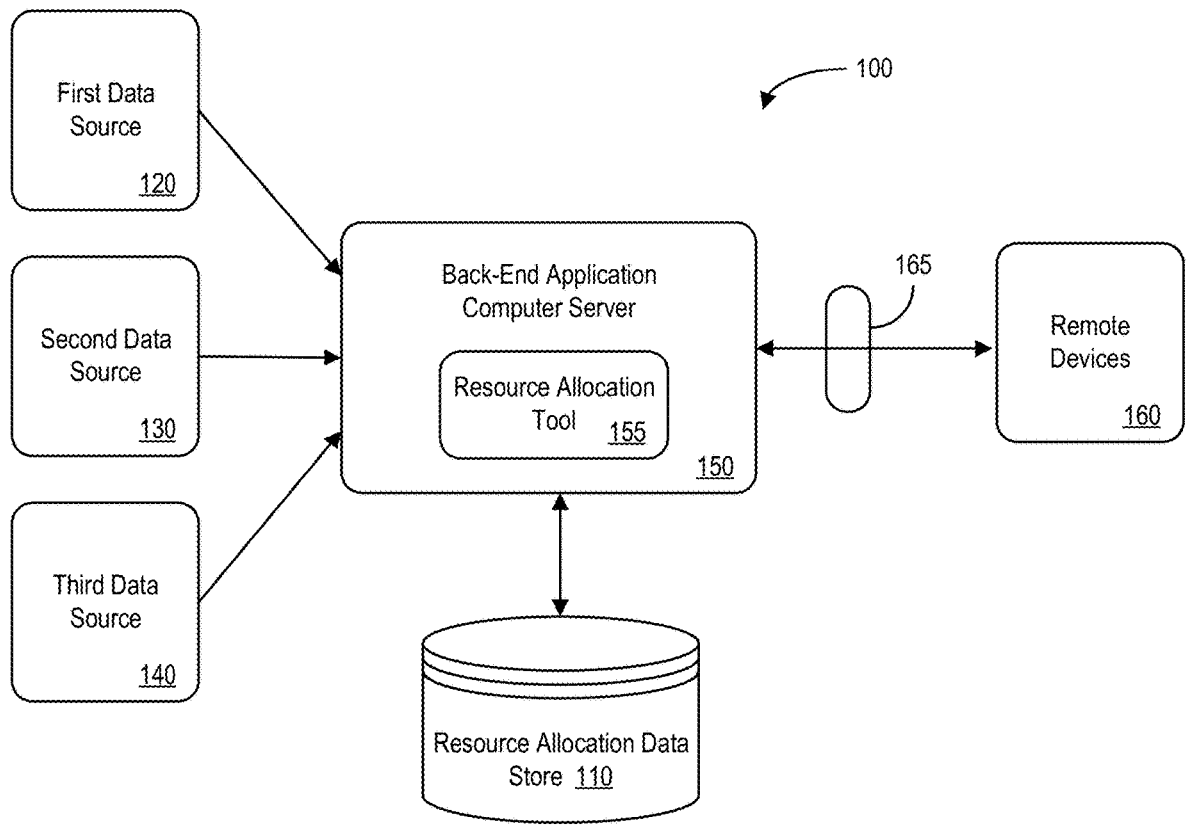
FIG. 1 is a high-level block diagram of a system in accordance with some embodiments.

For example, FIG. 1 is a high-level block diagram of a system 100 according to some embodiments of the present invention. In particular, the system 100 includes a back-end application computer 150 server that may access information in a resource allocation data store 110 (e.g., storing a set of electronic records representing requests for an allocation of resources, each record including, for example, one or more requested resource allocation identifiers, attribute variables, resource values, etc.). The back-end application computer server 150 may also retrieve information from other data stores or sources 120, 130, 140 in connection with a resource allocation tool 155 and apply machine learning or artificial intelligence algorithms and/or models to the electronic records. The back-end application computer server 150 may also exchange information with a remote device 160 (e.g., via communication port 165 that might include a firewall). According to some embodiments, an interactive graphical user interface platform of the back-end application computer server 150 (and, in some cases, third-party data) may facilitate the display of information associated with the resource allocation tool 155 via one or more remote computers (e.g., to enable a manual review of a resource allocation request) and/or the remote device 160. For example, the remote device 160 may receive updated information (e.g., a new event timeline) from the back-end application computer server 150. Based on the updated information, a user may review the data from the resource allocation data store 110 and take informed actions in response to requests. Note that the back-end application computer server 150 and/or any of the other devices and methods described herein might be associated with a cloud-based environment and/or a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate updates of electronic records in the resource allocation data store 110. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the resource allocation data store 110. The resource allocation data store 110 might, for example, store electronic records representing a plurality of resource allocation requests, each electronic record having a set of attribute values including one or more resource values. The resource allocation data store 110 may also contain information about prior and current interactions with entities, including those associated with the remote devices 160. The resource allocation data store 110 may be locally stored or reside remote from the back-end application computer server 150. As will be described further below, the resource allocation data store 110 may be used by the back-end application computer server 150 in connection with an interactive user interface to provide information about the resource allocation tool 155. Although a single back-end application computer server 150 is shown in FIG. 1, any number of such devices may be included. Moreover, various devices described herein might be combined according to embodiments of the present invention. For example, in some embodiments, the back-end application computer server 150 and the resource allocation data store 110 might be co-located and/or may comprise a single apparatus.

According to some embodiments, the system 100 may provide a dashboard view of insurance claim files. This might help, for example, an insurance claim handler quickly determine key claim information about an injured worker, insured, and/or treatment provider along with a risk score that might indicate when an insurance claim is veering "off track" (and might present a risk of a severe outcome for an enterprise).

Figure 2:
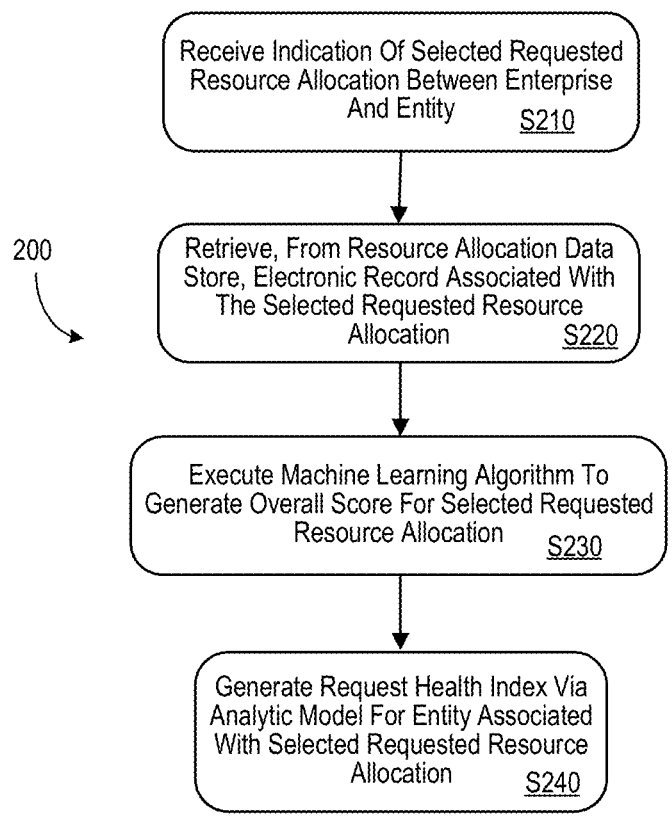
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server (e.g., associated with an enterprise) may receive an indication of a requested resource allocation between the enterprise and an entity. For example, an operator or administrator associated with the enterprise might select a resource allocation request from a list of pending resource allocation requests. According to some embodiments, the operator may search for requests based on an entity name, a request type, a date associated with the request, etc. At S220, the back-end application computer server may retrieve, from a resource allocation data store, an electronic record associated with the selected requested resource allocation, including the set of resource allocation values associated with risk attributes.

At S230, the system may execute a machine learning algorithm to generate an overall score for the selected requested resource allocation. As used herein, the phrase "machine learning" may refer to various artificial intelligence techniques including algorithms and mathematical models that computer systems use to continuously improve performance associated with a specific task. Machine learning algorithms may comprise a mathematical model of sample data (e.g., "training data" associated with prior insurance claims) to make predictions. The machine learning algorithms and models might be associated with computational statistics, mathematical optimization, data mining, and/or predictive analytics. The overall score might indicate high risk insurance claims (that is, the claim has similar characteristics as other prior claims that had severe outcomes for the enterprise). Note that a high overall score might not indicate that a particular insurance claim is "bad" but rather that additional attention should be paid to the details and handling of the claim.

At S240, the system may generate a request health index via an analytic model for the entity associated with the selected requested resource allocation. According to some embodiments, the back-end application computer server supports a graphical interactive user interface display via a distributed communication network, and the interactive user interface display provides resource allocation data including the overall score and the request health index.

Note that embodiments may leverage insights from multiple machine learning assets and claim metrics to give a holistic view of the claim in one place. Moreover, risks of certain aspects of a claim may be calculated by the system which can then provide a "next best action" to a claim handler. In addition, the data visualization of claim activity and risk factors may enable quick orientation to the claim and provides a direction where a claim handler's attention should be focused (and, in some embodiments, a next best action). Further note that embodiments may provide information to help claim handlers determine a course of action (without automatically making any claim decisions).

Figure 3:
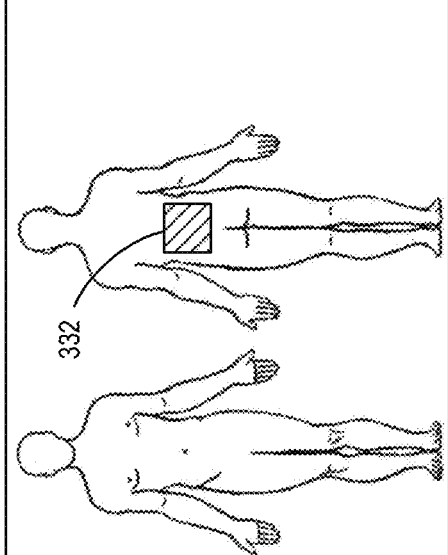
FIG. 3 is an example of an insurance claim avatar display for an insurance policy claim analysis tool in accordance with some embodiments.

FIG. 3 is an example of an insurance claim avatar display 300 for an insurance policy claim analysis tool in accordance with some embodiments. The display 300 might provide a claim detail data header 310 (e.g., including a date of loss, a compensability status, an open time status, a claimant age, and a claimant gender) and an insured detail data header 320 (e.g., including an insured name, a claim program, and a re-assignment count). The display 300 may also contain body diagrams (e.g., front and back views) providing a graphical representation of injury 330 including visual indication of claim or injury status 332 (e.g., associated with claim status, injury description, diagnosis and recover information). According to some embodiments, selection of an injury 332 (e.g., via touch screen or a computer mouse points) might result in a pop-up window providing additional information (e.g., an indication that the injury 332 is under investigation, is being treated, etc.). According to some embodiments, the display 300, along with the other displays described herein, give a claim handler a high-level, holistic view that aggregates data from various disparate sources in connection with a single workers' compensation insurance claim. Such a view may help the handler process the claim in a more efficient and accurate manner.

According to some embodiments, the claim avatar display 300 further includes resource allocation bar graphs 340 (e.g., associated with various costs including a total cost) along with information about the last payment to the claimant 350 (e.g., associated with a payment type, a status, a payment date, and a link to further payment details). The display may further include an overall score 360 (e.g., associated with how likely the claim is to dramatically change) and with prior claim information 370 (e.g., associated with other claims by the same claimant). A set of dial displays 380 (e.g., associated with various claim factors) might indicate to a claim handler whether various entities are relatively low-risk, relatively high-risk, etc. This claim (or "resource request") health index information might provide the claim handler with a view of the claim factors that draw his or her attention to the claim. The dial displays 380 may be related to various factors associated with the claim. If there is a potential of the claim increasing in severity (or it is identified that the insured is not happy with the progress of the claim), the claim handler will be alerted to that fact via the appropriate dial display 380. According to some embodiments, the claim avatar display 300 might further include map-based geographic information and/or event timeline information associated with a claim (not illustrated in FIG. 3). Selection of one of the dials displays 380 might result in a new page of information being displayed to the claim handler.

Figure 4:
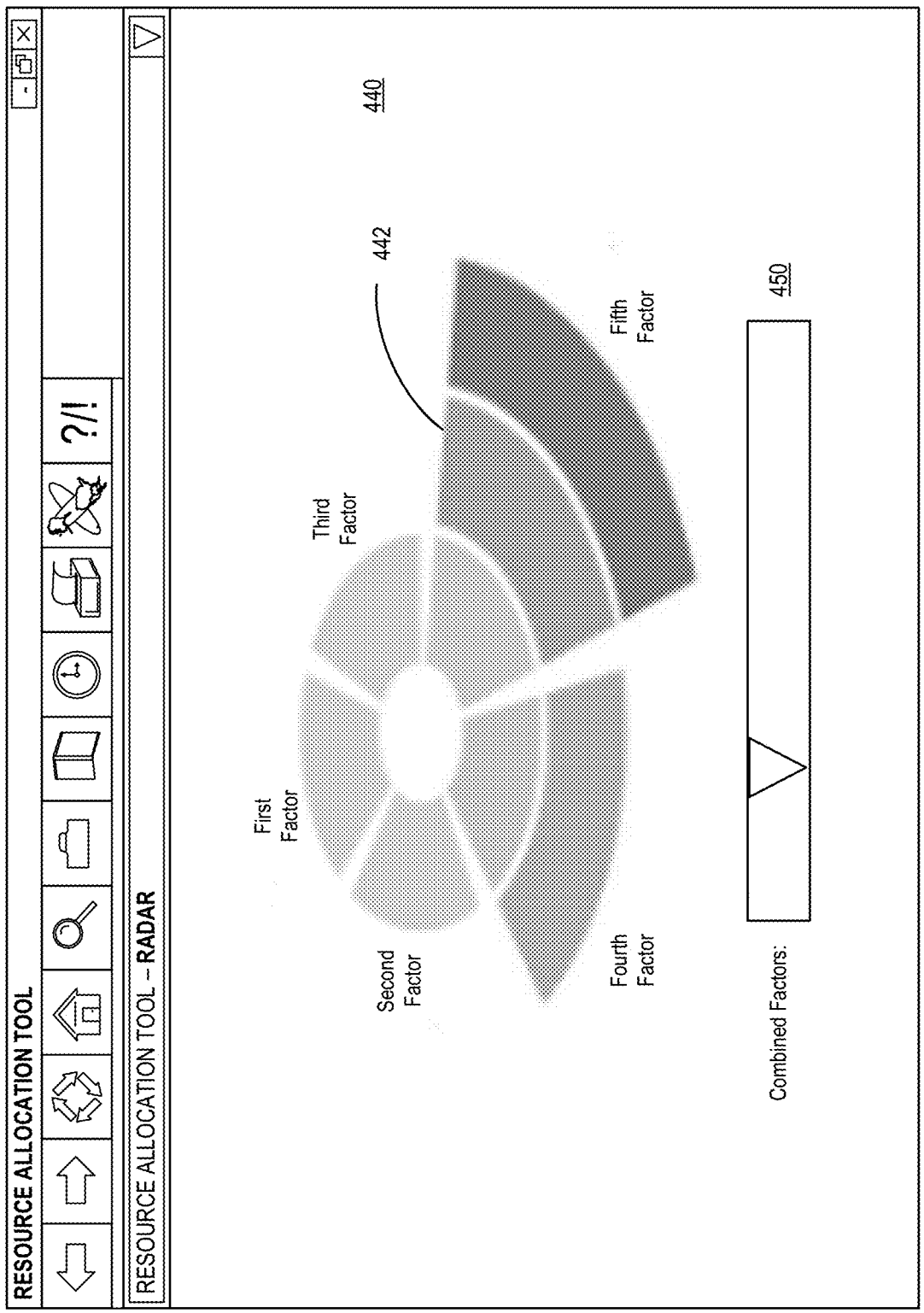
FIG. 4 is an example of a radar display according to some embodiments.
Figure 5:
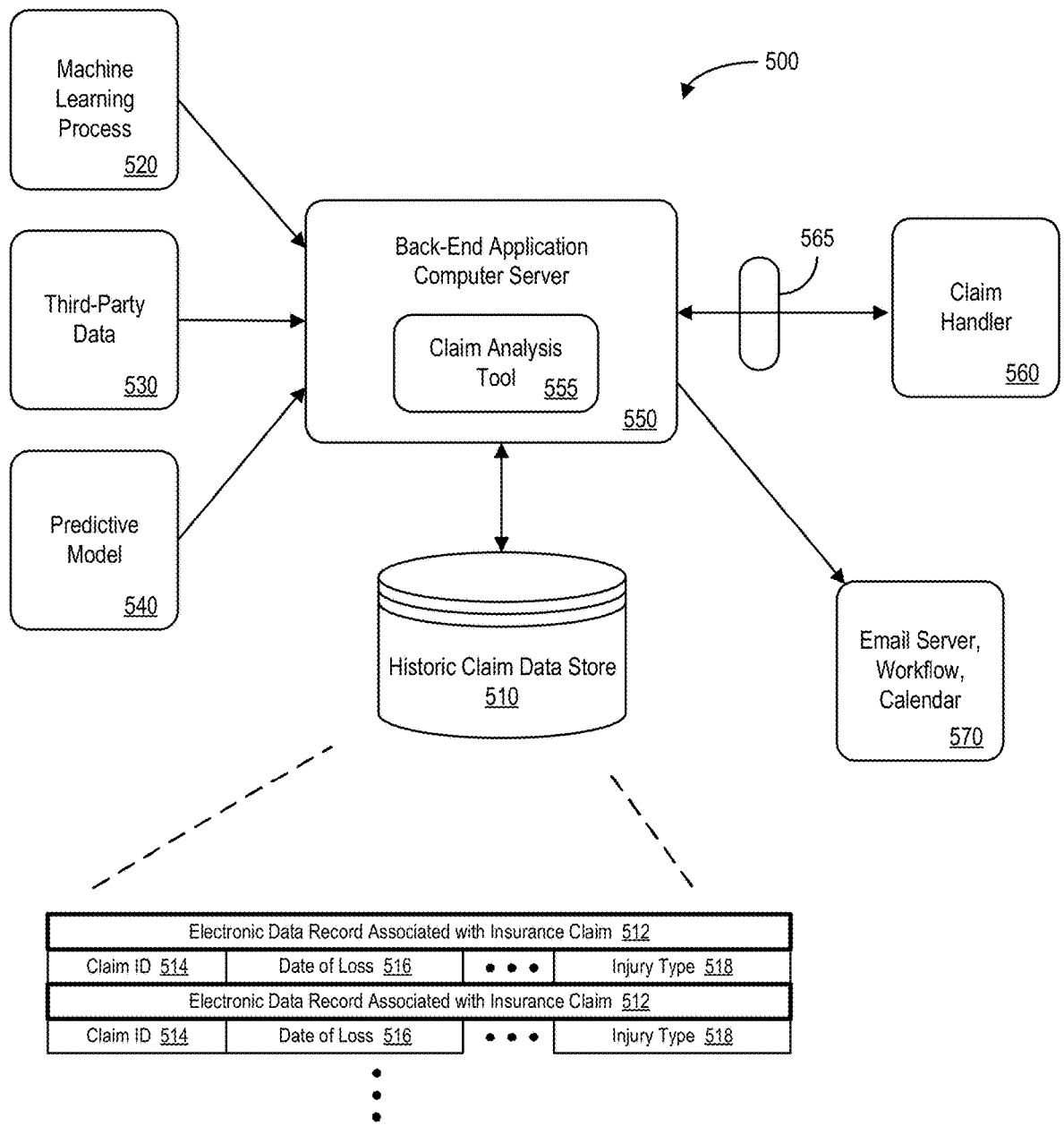
FIG. 5 is a more detailed high-level block diagram of a system in accordance with some embodiments.

FIG. 4 is an example of a radar display 400 according to some embodiments. A claim radar map 440 (e.g., associated with various claim factor). The radar map 440 may visually 442 draw a claim handler's attention to the factors related to the claimant and the conditions on file. This information might be pulled from concepts using natural language processing and discrete data fields indicating information such as International Statistical Classification of Diseases ("ICD") and Related Health Problems codes generated by the World Health Organization. As a result, the claim handler can easily see high-risk conditions and diagnoses identified on the claim along with any yellow flags or other claim factors that were identified in the claim. A combined factors score 450 might also be provided to the claim handler. FIG. 5 is a more detailed high-level block diagram of a system 500 in accordance with some embodiments. As before, the system 500 includes a back-end application computer 550 server that may access information in a historic claim data store 510. The back-end application computer server 550 may also retrieve information from a machine learning process 520, a third-party data 530 (e.g., from medical providers or police reports), and/or predictive models 540 in connection with an insurance claim analysis tool 555. The back-end application computer server 550 may also exchange information with a claim handler device 560 (e.g., via communication port 565 that might include a firewall) to enable a manual review of an insurance claim. The back-end application computer server 550 might also transmit information directly to an email server, workflow application, calendar application 570 to facilitate insurance claim processing.

The back-end application computer server 550 may store information into and/or retrieve information from the historic claim data store 510. The historic claim data store 510 might, for example, store electronic records 512 representing a plurality of insurance claims (e.g., resource allocation requests), each electronic record having a set of attribute values including a claim identifier 514, a date of loss 516, an injury type 518, etc. According to some embodiments, the system 500 may provide a dashboard view of insurance claim files.

Figure 6:
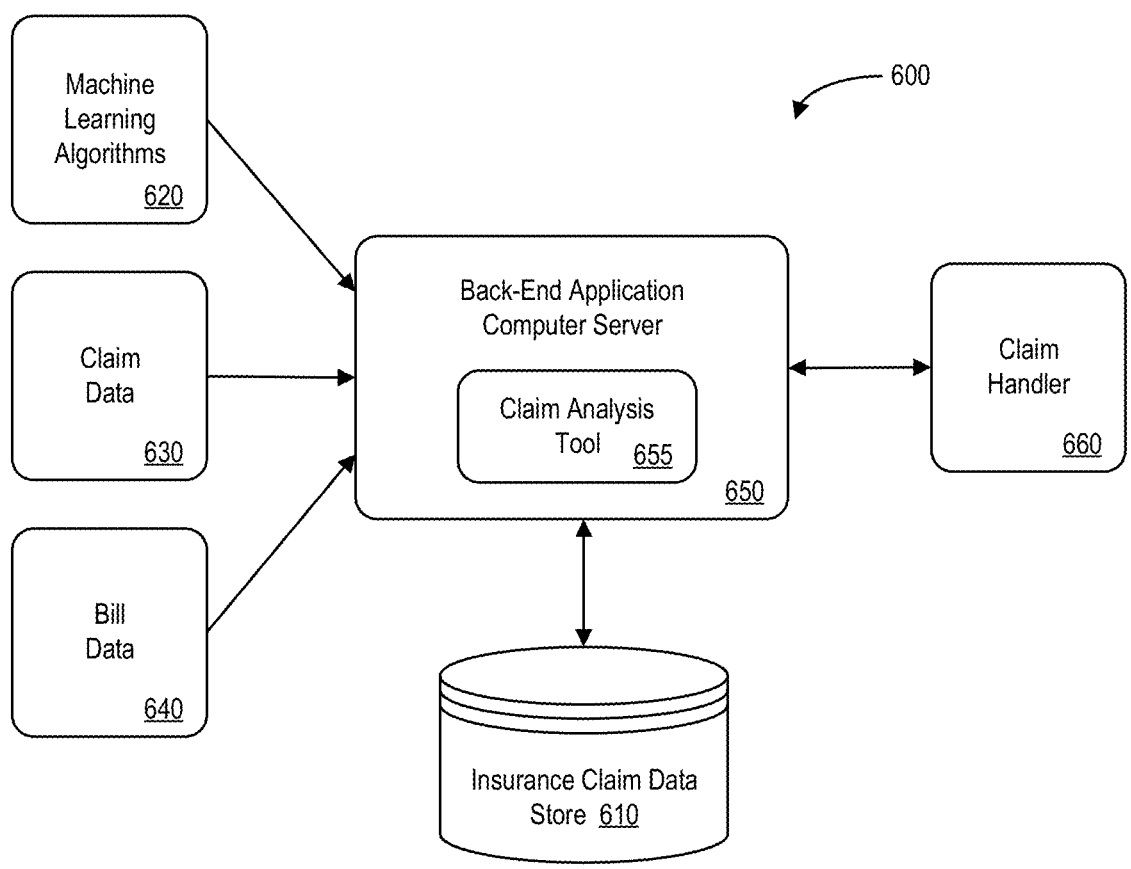
FIG. 6 is another high-level block diagram of a system in accordance with some embodiments.

FIG. 6 is another high-level block diagram of a system 600 in accordance with some embodiments. As before, claim analysis tool 655 executing at a back-end application computer server 650 may access information in a historic claim data store and transmit displays to a claim handler device 660. In this example, the claim analysis tool 655 may receive information from one or more machine learning algorithms 620, and the claim handler displays might utilize predictive models using data fields and text flags identified in files. The claim analysis tool 655 might also access claim data 630 to draw information that is available to the claim handler in their claim system (and, in some cases, data that is not visible to the claim handlers in the claim system). According to some embodiments, the claim analysis tool might also receive bill data 660 from a bill review system (e.g., associated with medical treatments from health care providers).

Figure 7:
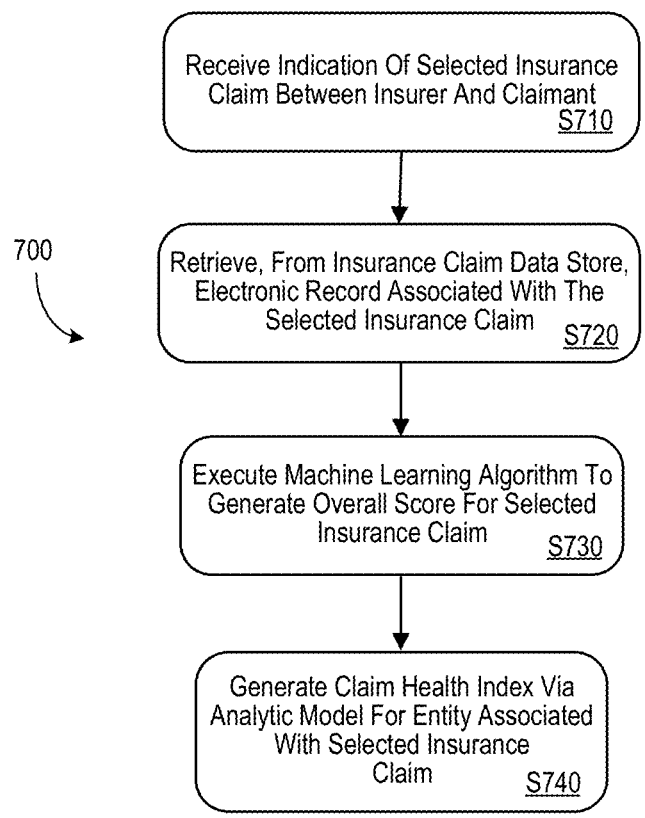
FIG. 7 illustrates a method according to some embodiments of the present invention.

FIG. 7 illustrates a method 700 according to some embodiments of the present invention. At S710, a back-end application computer server (e.g., associated with an insurer) may receive an indication of an insurance claim between the insurer and a claimant. For example, claim handler might select an insurance claim from a list of pending insurance claims. At S720, the back-end application computer server may retrieve, from an insurance claim data store, an electronic record associated with the selected insurance claim, including a claim identifier, date of injury, type of injury, etc.

At S730, the system may execute a machine learning algorithm to generate an overall score for the selected insurance claim. At S740, the system may generate a request health index via an analytic model for an entity associated with the selected insurance claim. According to some embodiments, the back-end application computer server supports a graphical claim handler display via a distributed communication network, and the claim handler display provides claim data including the overall score and the claim health index. The claim health index might be associated with, for example, various claim factors.

Figure 8:
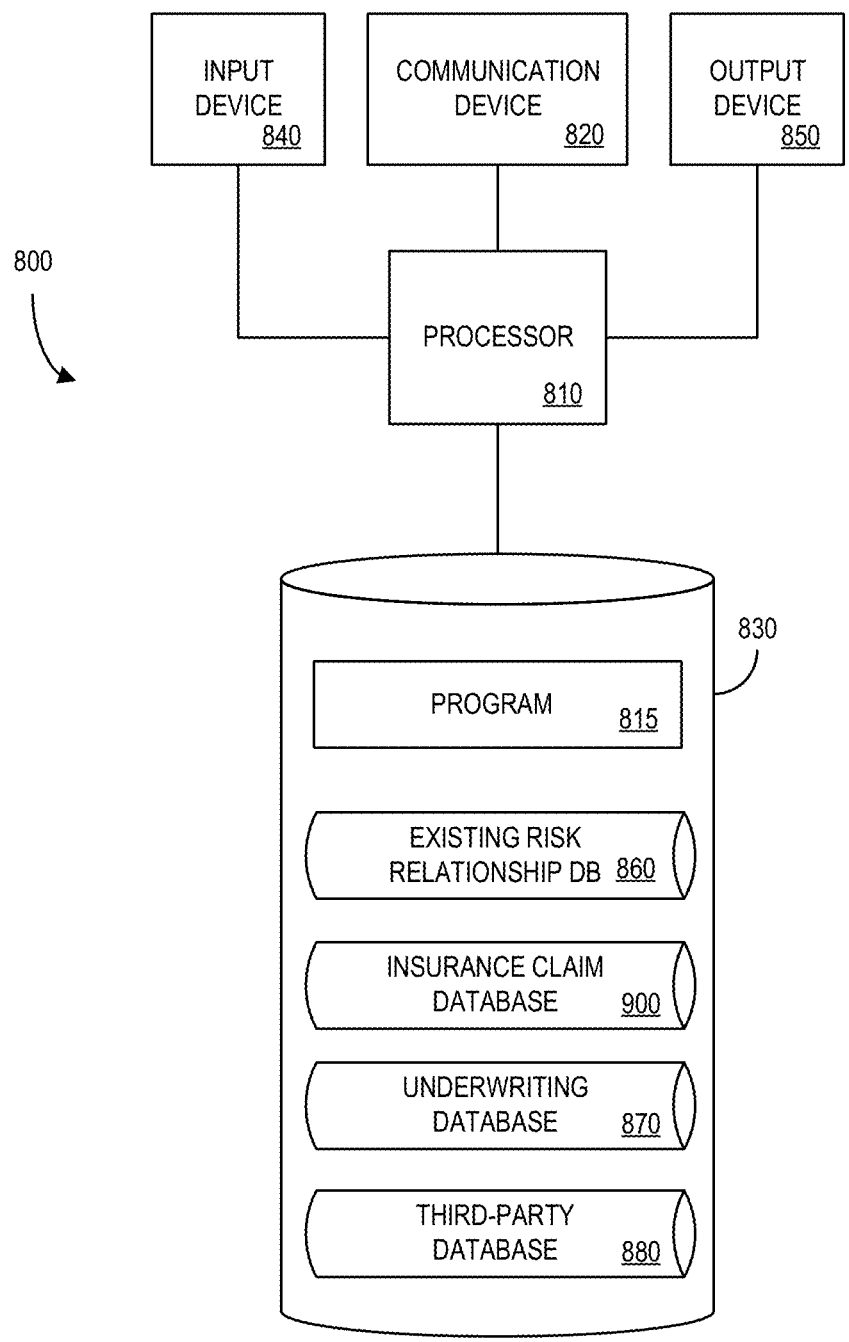
FIG. 8 is a block diagram of an apparatus in accordance with some embodiments of the present invention.

The embodiments described herein may be implemented using any number of different hardware configurations. For example, FIG. 8 illustrates an apparatus 800 that may be, for example, associated with the systems 100, 800, 900 described with respect to FIGS. 1, 8 and 9, respectively. The apparatus 800 comprises a processor 810, such as one or more commercially available Central Processing Units ("CPUs") in the form of one-chip microprocessors, coupled to a communication device 820 configured to communicate via communication network (not shown in FIG. 8). The communication device 820 may be used to communicate, for example, with one or more remote administrator computers and or communication devices (e.g., PCs and smartphones). Note that communications exchanged via the communication device 820 may utilize security features, such as those between a public internet user and an internal network of the insurance enterprise. The security features might be associated with, for example, web servers, firewalls, and/or PCI infrastructure. The apparatus 800 further includes an input device 840 (e.g., a mouse and/or keyboard to enter information about an insured, injuries, claim negotiations, etc.) and an output device 850 (e.g., to output reports regarding insurance claim status).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 815 and/or a resource allocation tool or application for controlling the processor 810. The processor 810 performs instructions of the program 815, and thereby operates in accordance with any of the embodiments described herein. For example, the processor 810 may provide an automated risk relationship resource allocation tool. A resource allocation data store may contain electronic records representing requested resource allocations between the enterprise and a plurality of entities. The processor 810 may receive an indication of a selected requested resource allocation and retrieve, from the resource allocation data store, the electronic record associated with the selected requested resource allocation. The processor 810 may execute a machine learning algorithm to generate an overall score for the selected requested resource allocation and generate a request health index via an analytic model for the entity associated with the selected requested resource allocation. The processor 810 may then support a graphical interactive user interface display via a distributed communication network, the interactive user interface display providing resource allocation data including the overall score and the request health index.

The program 815 may be stored in a compressed, uncompiled and/or encrypted format. The program 815 may furthermore include other program elements, such as an operating system, a database management system, and/or device drivers used by the processor 810 to interface with peripheral devices.

As used herein, information may be "received" by or "transmitted" to, for example: (i) the back-end application computer server 800 from another device; or (ii) a software application or module within the back-end application computer server 800 from another software application, module, or any other source.

In some embodiments (such as shown in FIG. 8), the storage device 830 further stores an existing risk relationship database 860 (e.g., containing insurance policy information), an insurance claim database 900, an underwriting database 870, and a third-party database 880. An example of a database that might be used in connection with the apparatus 800 will now be described in detail with respect to FIG. 9. Note that the database described herein is only an example, and additional and/or different information may be stored therein. Moreover, various databases might be split or combined in accordance with any of the embodiments described herein. For example, the existing risk relationship database 860 and the insurance claim database 900 might be combined and/or linked to each other within the program 815.

Figure 9:
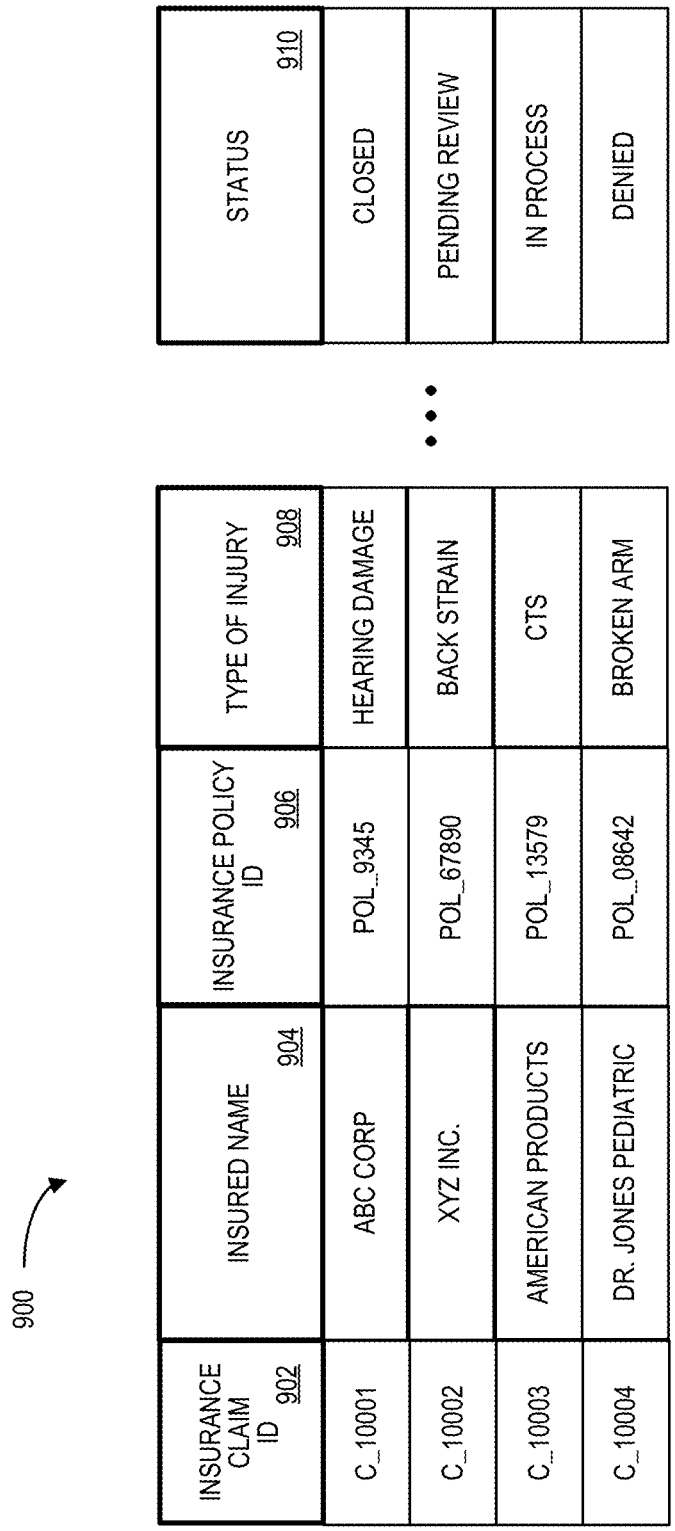
FIG. 9 is a portion of a tabular resource allocation database according to some embodiments.

Referring to FIG. 9, a table is shown that represents the insurance claim database 900 that may be stored at the apparatus 900 according to some embodiments. The table may include, for example, entries associated with insurance claims that have been submitted by claimants. The table may also define fields 902, 904, 906, 908, 910 for each of the entries. The fields 902, 904, 906, 908, 910 may, according to some embodiments, specify: an insurance claim identifier 902, an insured name 904, an insurance policy identifier 906, a type of injury 908, and a status 910. The insurance claim database 900 may be created and updated, for example, based on information electrically received from various operators, administrators, and computer systems, including those associated with an insurer.

The insurance claim identifier 902 may be, for example, a unique alphanumeric code identifying a request for resources (e.g., when an employee working for an insured becomes injured while at work). The insured name 904 might be associated with the owner of insurance policy associated with the identifier 906. The type of injury 908 might indicate when the worker was hurt. Note that the database 900 will include additional information about each insurance claim (not illustrated in FIG. 9), such as claim handler notes, medical treatment costs, legal negotiations, etc. The status 910 might indicate that the insurance claim is closed, pending review, in process, denied, etc.

Thus, embodiments may provide an automated and efficient way to provide an automated risk relationship resource allocation tool in a way that provides faster, more accurate results as compared to traditional approaches. Embodiments may aggregate data from multiple sources and use machine learning algorithms to help claim handlers to quickly recognize which claims might need closer attention. By digesting information, such as medical records, and applying artificial intelligence, embodiments may leverage available data and automate medical treatment judgements, help motivate and influence claimant behavior, etc. The displays may provide a "360" degree view of a claim or customer including aggregated data from many different sources. For example, a claim handler might quickly understand two years of complex claim processing with such an end-to-end view of the data. Note that the data used to render the displays described herein might include data from unstructured sources, such as paragraphs of text from manually created notes, governmental or medical documents, phone call transcripts, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., professional liability insurance policies, extreme weather insurance policies, etc.). Similarly, although certain attributes (e.g., values analyzed in connection with resource allocation requests) were described in connection some embodiments herein, other types of attributes might be used instead.

Figure 10:
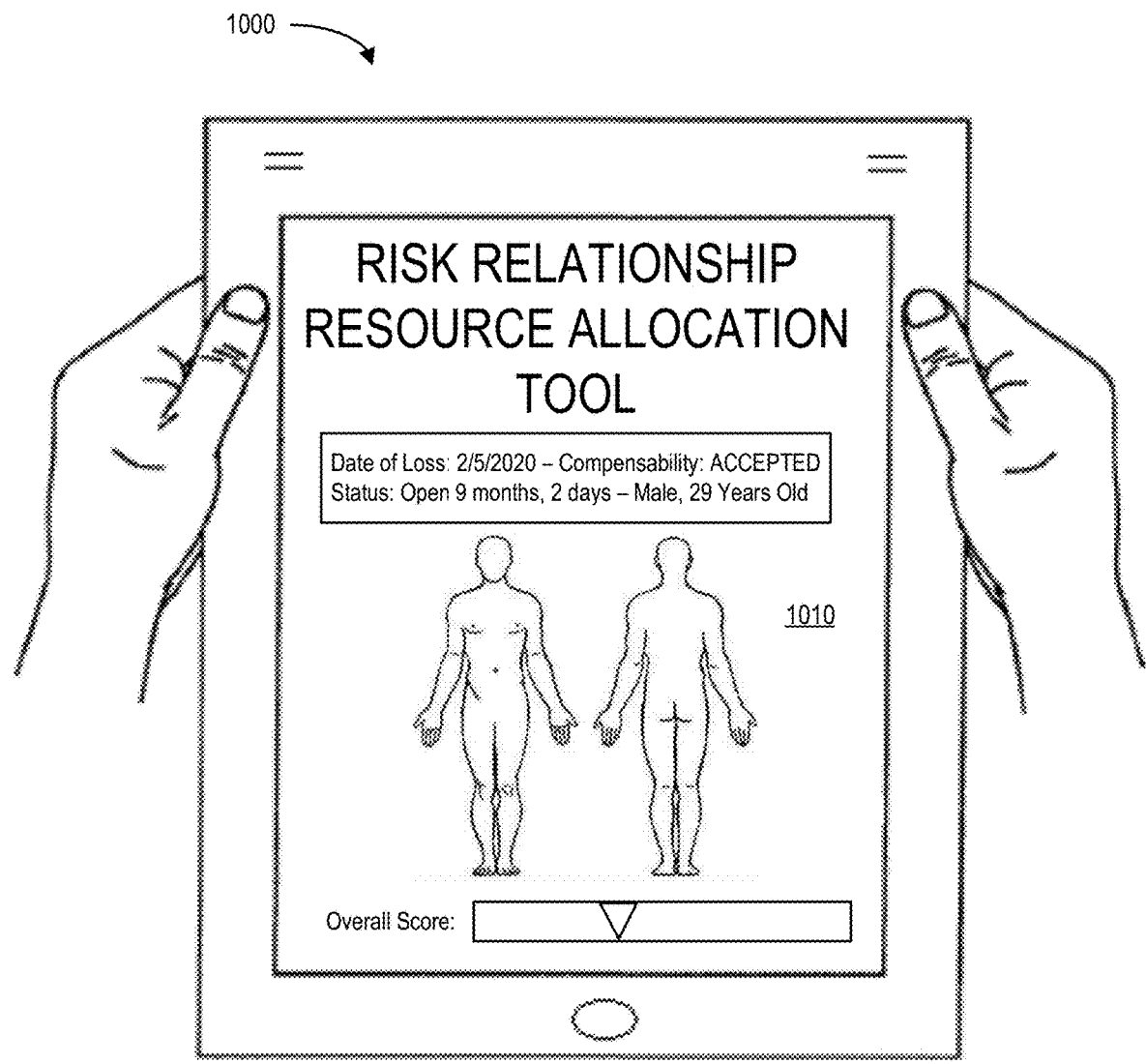
FIG. 10 illustrates a tablet computer displaying a risk relationship resource allocation tool user interface according to some embodiments.

Further, the displays and devices illustrated herein are only provided as examples, and embodiments may be associated with any other types of user interfaces. For example, FIG. 10 illustrates a handheld tablet computer 1000 showing a risk relationship resource allocation tool display 1010 according to some embodiments. The resource allocation tool display 1010 might include user-selectable data that can be selected and/or modified by a user of the handheld computer 1010 to provide information about insurance claims.

Note that the displays described herein might be constantly updated based on new information (e.g., as data is received by the insurer). For example, the displays might be updated in substantially real time or on a periodic basis (e.g., once each night). According to some embodiments, a claim handler might be able to select a particular time in the past and the displays may be updated to reflect the information as it previously existed at that particular time (e.g., what would the claim handler have seen one year ago?).

Figure 11:
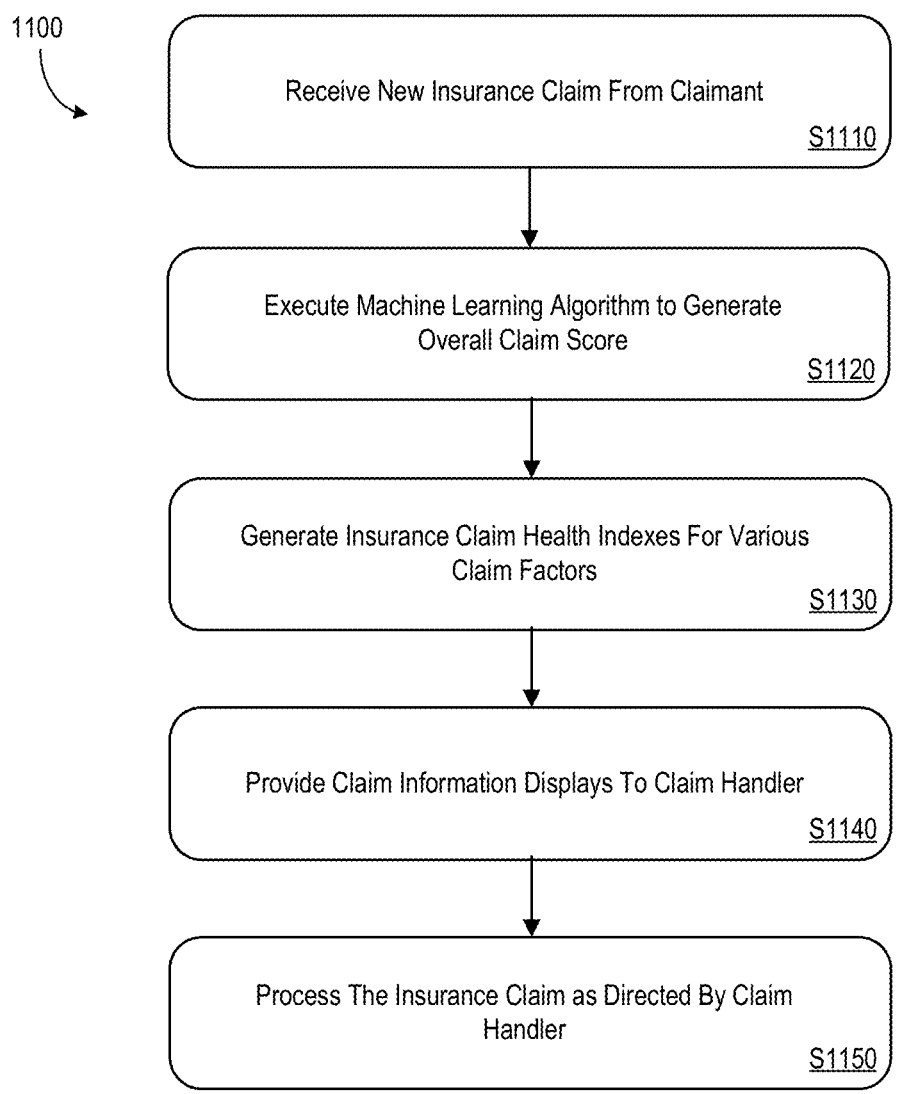
FIG. 11 illustrates an overall process in accordance with some embodiments.

FIG. 11 illustrates an overall business process 1100 in accordance with some embodiments. At S1110, an insurer may receive a new insurance claim from a claimant. This information may be collected from various sources, including medical records, an incident report, etc. At S1120, a machine learning algorithm is executed to generate an overall score. The overall score might indicate, for example, how likely it is that the insurance claim will change dramatically in the future. At S1130, insurance claim health indexes are generated or updated for various claim factors. The health indexes might help a claim handler recognize which claims and/or which entities warrant more attention than usual. The overall score and/or claim health indexes might be based on various weighted combinations of different types of claim factor variables (e.g., with each type of variable including tens or even hundreds of individual factors). At S1140, claim information displays are provided to a claim handler (e.g., as described in connection with FIGS. 3 and 4). The insurer may then process the insurance claim as directed by the claim handler (e.g., by approving medical procedures or otherwise recommending a medical treatment, implementing a return-to-work strategy, etc.) at S1150.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to provide a workers compensation insurance claim dashboard tool via a back-end application computer server of an enterprise, comprising:
   (a) a claims data store containing electronic records that represent a plurality of workers compensation insurance claims, wherein each electronic record includes an electronic record identifier and a set of data associated with attributes of the workers compensation insurance claims;
   (b) the back-end application computer server, coupled to the claims data store, the back-end application computer server including a processor and a memory device in communication with the processor, the memory device storing program instructions for controlling the processor, the back-end application computer server programmed to:
(i) receive an indication of a selected claim,
(ii) retrieve, from the claim data store, the electronic record associated with the selected claim, including the set of data associated with attributes of the selected claim, without retrieving electronic records associated with the other workers compensation insurance claims,
(iii) aggregate, by an insurance claim analysis tool, data included in the retrieved electronic record along with:
an overall score for the selected claim generated by a machine learning algorithm trained with data associated with prior insurance claims,
data received from a third-party, and
information from a predictive model that utilizes data fields and text flags identified in received files, and
(iv) process the aggregated data to generate display data,
(c) a communication port coupled to the back-end application computer server;
(d) a display device receiving the display data via the communication port and the distributed communication network, the display device presenting a graphical interactive user interface display in accordance with the received display data, the graphical interactive user interface display including:
a claim detail data header;
body diagrams including graphical representation of an injury incurred by a claimant associated with the selected claim;
a plurality of bar graphs each indicative of a payment made with respect to the selected claim; and
a plurality of dial displays each indicative of a respective attribute of the selected claim, a first one of said dial displays indicating a first claim score with respect to the selected claim, and a second one of said dial displays indicating a second claim score with respect to the selected claim; at least one of said dial displays indicating risk related data associated with the selected claim; at least one of said dial displays being selectable to provide an additional page of information regarding the selected claim;
(e) an email server, coupled to the back-end application computer server, that automatically receives information from the back-end application computer server to facilitate processing of the selected claim; and
(f) a calendar application, coupled to the back-end application computer server, that automatically receives information from the back-end application computer server to facilitate processing of the selected claim.

2. The system of claim 1, wherein the graphical interactive user interface display further provides a radar map to draw attention to factors related to the selected claim that are associated with high-risk conditions.

3. The system of claim 1, further comprising:
a workflow application, coupled to the back-end application computer server, that automatically receives information from the back-end application computer server to facilitate processing of the selected claim.

4. The system of claim 1, wherein the set of data associated with attributes of the workers compensation insurance claims in the claims data store includes at least one of: an insurance claim identifier; an insured name; an insurance policy identifier; a type of injury; and a status.

5. The system of claim 1, wherein the data received from the third party includes at least one of: information from medical providers; and police reports.

6. The system of claim 1, wherein one of the plurality of bar graphs on the graphical interactive user interface display comprises a total cost bar graph.

7. The system of claim 1, wherein the graphical interactive user interface display further includes information about a last payment to the claimant.

8. The system of claim 7, wherein the information about the last payment to the claimant includes at least one of: a payment type; a status; a payment date; and a link to further payment details.

9. A computerized method to provide a workers compensation claim dashboard tool via a back-end application computer server of an enterprise, the back-end application computer server including a processor and a memory device in communication with the processor, the memory device storing program instructions for controlling the processor, the method comprising:
receiving, by the processor of the back-end application computer server from a claims data store, an indication of a selected claim, wherein the claims data store contains electronic records that represent a plurality of workers compensation insurance claims, and further wherein each electronic record includes an electronic record identifier and a set of data associated with attributes of the workers compensation insurance claims;
retrieving, from the claims data store, the electronic record associated with the selected claim, including the set of data associated with attributes of the selected claim, without retrieving electronic records associated with the other workers compensation insurance claims;
aggregating, by an insurance claim analysis tool, data included in the retrieved electronic record along with:
an overall score for the selected claim generated by a machine learning algorithm trained with data associated with prior insurance claims,
data received from a third-party, and
information from a predictive model that utilizes data fields and text flags identified in received files;
processing the aggregating data to generate display data;
receiving, by a display device, the display data;
presenting, by the display device, a graphical interactive user interface display in accordance with the received display data, the graphical interactive user interface display including:
a claim detail data header;
body diagrams including graphical representation of an injury incurred by a claimant associated with the selected claim;
a plurality of bar graphs each indicative of a payment made with respect to the selected claim; and
a plurality of dial displays each indicative of a respective attribute of the selected claim, a first one of said dial displays indicating a first claim score with respect to the selected claim, and a second one of said dial displays indicating a second claim score with respect to the selected claim; at least one of said dial displays indicating risk related data associated with the selected claim; at least one of said dial displays being selectable to provide an additional page of information regarding the selected claim;
automatically receiving, by an email server coupled to the back-end application computer server, information from the back-end application computer server to facilitate processing of the selected claim; and
automatically receiving, by a calendar application coupled to the back-end application computer server, information from the back-end application computer server to facilitate processing of the selected claim.

10. The method of claim 9, wherein the graphical interactive user interface display further provides a radar map to draw attention to factors related to the selected claim that are associated with high-risk conditions.

11. The method of claim 9, further comprising:
automatically receiving, by a workflow application coupled to the back-end application computer server, information from the back-end application computer server to facilitate processing of the selected claim.

12. The method of claim 9, wherein the set of data associated with attributes of the workers compensation insurance claims in the claims data store includes at least one of: an insurance claim identifier; an insured name; an insurance policy identifier; a type of injury; and a status.

13. The method of claim 9, wherein the data received from the third party includes at least one of: information from medical providers; and police reports.

14. The method of claim 9, wherein one of the plurality of bar graphs on the graphical interactive user interface display comprises a total cost bar graph.

15. The method of claim 9, wherein the graphical interactive user interface display further includes information about a last payment to the claimant.

16. The method of claim 15, wherein the information about the last payment to the claimant includes at least one of: a payment type; a status; a payment date; and a link to further payment details.

17. A non-transitory, computer-readable medium storing instructions, that, when executed by a processor, cause the processor to perform a method to provide a workers compensation insurance claim dashboard tool via a back-end application computer server of an enterprise, the method comprising:
receiving, by a computer processor of the back-end application computer server from a claims data store, an indication of a selected claims data store contains electronic records that represent a plurality of workers compensation insurance claims, and further wherein each electronic record includes an electronic record identifier and a set of data associated with attributes of the workers compensation insurance claims;
retrieving, from the claims data store, the electronic record associated with the selected claim, including the set of data associated with attributes of the selected claim, without retrieving electronic records associated with the other workers compensation insurance claims;
aggregating, by an insurance claim analysis tool, data included in the retrieved electronic record along with:
an overall score for the selected claim generated by a machine learning algorithm trained with data associated with prior insurance claims,
data received from a third-party, and
information from a predictive model that utilizes data fields and text flags identified in received files;
processing the aggregated data to generate display data;
receiving, by a display device, the display data; and
presenting, by the display device, a graphical interactive user interface display in accordance with the received display data, the graphical interactive user interface display including:
a claim detail data header;
body diagrams including graphical representation of an injury incurred by a claimant associated with the selected claim;
a plurality of bar graphs each indicative of a payment made with respect to the selected claim; and
a plurality of dial displays each indicative of a respective attribute of the selected claim, a first one of said dial displays indicating a first claim score with respect to the selected claim, and a second one of said dial displays indicating a second claim score with respect to the selected claim; at least one of said dial displays indicating risk related data associated with the selected claim; at least one of said dial displays being selectable to provide an additional page of information regarding the selected claim;
automatically receiving, by an email server coupled to the back-end application computer server, information from the back-end application computer server to facilitate processing of the selected claim; and
automatically receiving, by a calendar application coupled to the back-end application computer server, information from the back-end application computer server to facilitate processing of the selected claim.

18. The medium of claim 17, wherein the graphical interactive user interface display further provides a radar map to draw attention to factors related to the selected claim that are associated with high-risk conditions.

19. The medium of claim 17, wherein the method further comprises:
automatically receiving, by a workflow application coupled to the back-end application computer server, information from the back-end application computer server to facilitate processing of the selected claim.

20. The medium of claim 17, wherein the set of data associated with attributes of the workers compensation insurance claims in the claims data store includes at least one of: an insurance claim identifier; an insured name, an insurance policy identifier; a type of injury; and a status.

21. The medium of claim 17, wherein the data received from the third party includes at least one of: information from medical providers; and police reports.

22. The medium of claim 17, wherein one of the plurality of bar graphs on the graphical interactive user interface display comprises a total cost bar graph.

23. The medium of claim 17, wherein the graphical interactive user interface display further includes information about a last payment to the claimant.

24. The medium of claim 23, wherein the information about the last payment to the claimant includes at least one of: a payment type; a status; a payment date; and a link to further payment details.

* * * * *